(12) United States Patent
Bouamama et al.

(10) Patent No.: US 10,423,753 B1
(45) Date of Patent: Sep. 24, 2019

(54) METHOD AND APPARATUS FOR EFFICIENT AND ACCURATE SIGNAL ELECTROMIGRATION ANALYSIS OF DIGITAL-ON-TOP DESIGNS WITH COMPLEX INTERFACE PIN SHAPES

(71) Applicant: Cadence Design Systems, Inc., San Jose, CA (US)

(72) Inventors: Abdelhakim Bouamama, San Jose, CA (US); Hao Ji, San Jose, CA (US); Raja Mitra, San Jose, CA (US); Jun Chen, Fremont, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 35 days.

(21) Appl. No.: 15/721,190

(22) Filed: Sep. 29, 2017

(51) Int. Cl.
*G06F 17/50* (2006.01)
(52) U.S. Cl.
CPC .................................. *G06F 17/5081* (2013.01)
(58) Field of Classification Search
USPC .......................................................... 716/111
See application file for complete search history.

(56) References Cited

U.S. PATENT DOCUMENTS

| | | | |
|---|---|---|---|
| 2007/0204245 A1* | 8/2007 | Fotakis | G06F 17/5036 716/115 |
| 2012/0022846 A1* | 1/2012 | White | G06F 17/5068 703/14 |
| 2013/0305194 A1* | 11/2013 | Wang | G06F 17/5081 716/52 |
| 2015/0186591 A1* | 7/2015 | Gurney | G06F 17/5036 716/116 |
| 2017/0169151 A1* | 6/2017 | Cellier | G06F 17/5072 |

* cited by examiner

*Primary Examiner* — Mohammed Alam
(74) *Attorney, Agent, or Firm* — Vista IP Law Group, LLP

(57) ABSTRACT

An approach is described for efficient and accurate signal electromigration analysis of digital-on-top designs with complex interface pin shapes. According to some embodiments, the approach includes performance of parasitic analysis for the interface between nets and primitive/macro cell (blocks). Specifically, the approach includes performing parasitic analysis based on actual location information corresponding to overlap/connection between ports within blocks, external net connections to the ports, and internal net (block net) connections to the port. Thus, by determining the actual locations of the connections (as opposed to a presumed location) the parasitic effects associated with the ports and the connections thereof can be calculated.

20 Claims, 23 Drawing Sheets

Illustration 411

METHOD AND APPARATUS FOR EFFICIENT AND ACCURATE SIGNAL ELECTROMIGRATION ANALYSIS OF DIGITAL-ON-TOP DESIGNS WITH COMPLEX INTERFACE PIN SHAPES

BACKGROUND

Computer aided design (CAD) tools are often used for creating and validating electronic designs such as systems, chips, and other logical representations of items to be created under certain rules or conditions. An electronic design automation (EDA) system is one type of CAD tool for creating electronic designs.

EDA tools are often used for performing design rule compliance verification, and/or correction of design rule violations such as rules (e.g. conditions) corresponding to electromigration specifications and may further include, enforcement of performance parameters, spacing requirements between objects, overlap or contact between objects (e.g. connections to various parts of a net), and other rules relevant to positioning and interconnection between objects in relation to a substrate or other support structure.

Modern electronic devices are often made using the aforementioned EDA tools. This is necessitated in part by the infrastructure that is used in the manufacture of these devices and in part because of the size of the elements that make up these devices, e.g. nanometer level features. However, as the feature size used in electronic circuits has shrunk the relative effects of electromigration and the level of accuracy required to properly analyze circuits has increased, at least regarding electromigration analysis and especially for advanced technology nodes.

Therefore, what is needed is an improved approach for efficient and accurate signal electromigration analysis of digital-on-top designs with complex interface pin shapes.

SUMMARY

Embodiments of the present invention provide an improved approach for efficient and accurate signal electromigration analysis of digital-on-top designs with complex interface pin shapes. According to some embodiments, the approach includes performance of parasitic analysis for the interface between nets and primitive/macro cell (blocks). Specifically, the approach includes performing parasitic analysis based on actual location information corresponding to overlap between ports of blocks, nets connected to the ports, and block nets connected to the ports. Thus, by determining the actual locations of the connections (as opposed to a presumed location) the parasitic effects associated with the ports and the connections thereof can be calculated.

Other additional objects, features, and advantages of the invention are described in the detailed description, figures, and claims.

BRIEF DESCRIPTION OF FIGURES

In order that the present invention is better understood, some embodiments of the invention will now be described, by way of example only, with reference to the accompanying drawings.

DETAILED DESCRIPTION

Embodiments of the present invention provide a system, method, and product for implementing an improved approach for determining waiver applicability conditions and applying the conditions to multiple errors or warnings in physical verification tools.

Generally, modern circuits are designed using the aforementioned EDA tools which themselves generate various set of data describing circuits such as LEF/DEF/GDS/OASIS formatted data (library exchange format, design exchange format, graphic database system). The LEF/DEF/GDS/OASIS data itself may correspond to multiple primitives/macro (blocks) cells. This data is normally processed using various parasitics extractors to determine resistance, capacitance, and possibly inductance characteristics of a design which is often stored as DSPF formatted data (detailed standard parasitics format) before performing signal electromigration analysis. The present disclosure provides a system, method, and product for at least an improved approach.

In particular, prior approaches fail to account for the position/location of connections between nets and ports, and between block nets of ports, and the paths between the connections. For example, systems may presume that the position/locations are in the middle, or may presume that the net and block net occupy the same space. At least in part to address this, some embodiments perform electromigration analysis for interface pin shapes for some identified blocks. The process may use design data to map the ports to nets and block nets of the identified blocks (as used herein net(s) refer generally to signal paths that connect external elements to blocks and a block net(s) refer generally to signal paths that are internal to a block). Finally, the processing is completed by performing parasitic extraction and signal EM analysis for the mapped ports, nets, and block nets. The mapping may further comprises dividing the interface pin shapes corresponding to the ports into segments, and determining the areas of overlap between ports and nets by identifying segments in which the ports and the nets and/or block nets overlap. In some embodiments, paths between the areas of overlap are identified by segments between the areas of overlap. The port segment size can comprise any of a global segment size, a block specific segment size, or a port specific segment size. Thus, the present disclosure provides an improvement to the field by providing more accurate results, and present an improvement to the functioning of the computer by providing an efficient process for determining the signal electromigration effects of pins and connections thereof.

Figure 1:
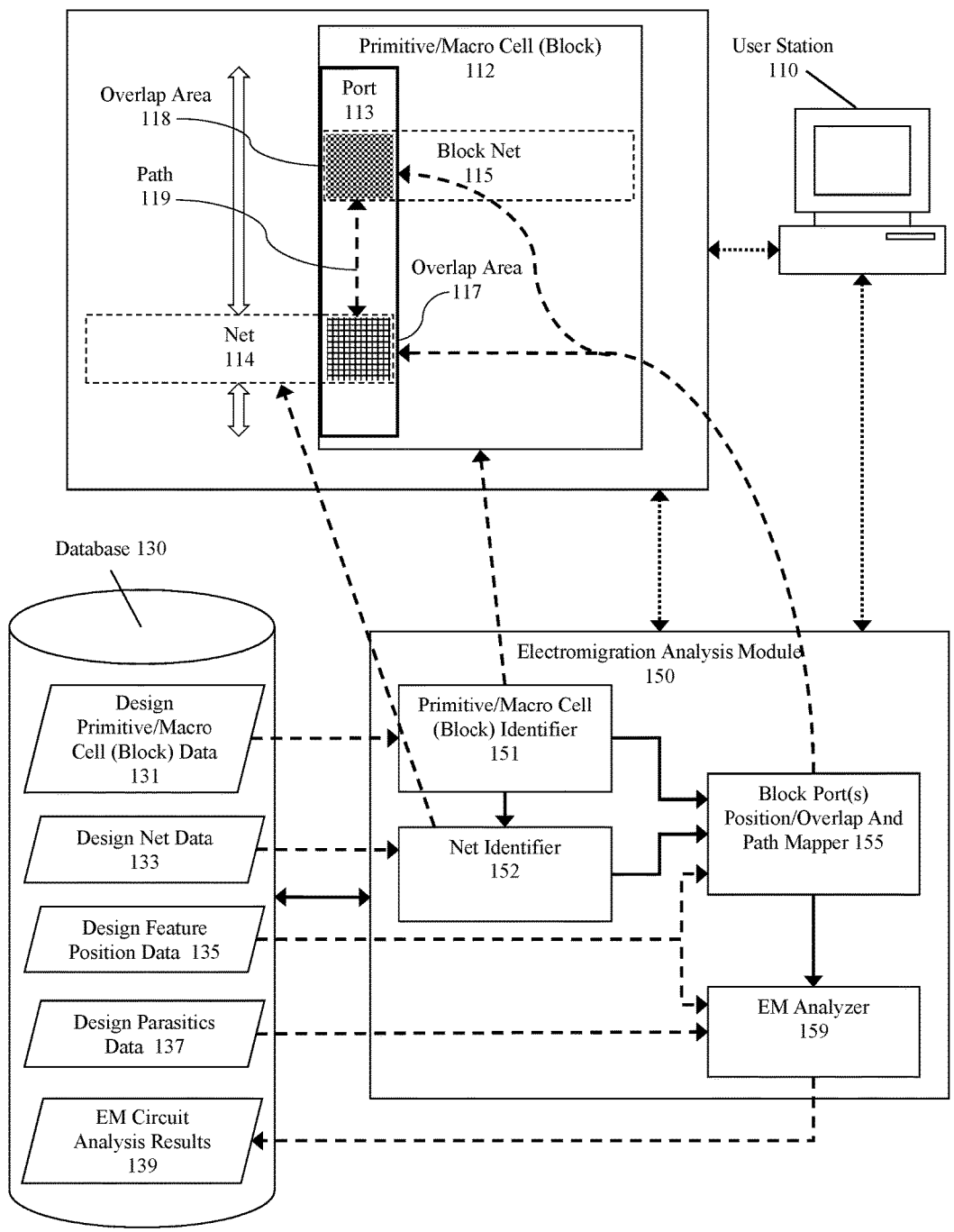
FIG. 1 depicts an example system for efficient and accurate signal electromigration analysis of digital-on-top designs with complex interface pin shapes.

FIG. 1 depicts an example system for efficient and accurate signal electromigration analysis of digital-on-top designs with complex interface pin shapes according to some embodiments of the invention.

Illustration 111 provides a simplified example of connections between a net and a block net over a port. A net can be connected at any point/area on a port and a block net can likewise be connected at any point/area of a port. Furthermore, while the illustration represents the port, the net, and block net as having similar proportions real circuits may have drastically different or more complex shapes. As a result, the overall effects of the port shapes and the connection areas of the ports can have relatively significant effects on the behavior of a circuit. Thus, determining or failing to determine the actual locations of those connections corresponds to varying degrees of inaccuracy which can ultimately lead to unexpected failures or require overly conservative circuit designs in order to account for the otherwise unknown effects of the port connects. Furthermore, with an increase in the complexity of port shapes and possibly disparities in proportions between the ports, the nets, and block nets comes an increased potential for calculated electromigration effects to deviate from actual electromigration effects when the calculated electromigration effects are based on presumed areas of overlap. For example, if the net 114 and the block net 115 are presumed to be connected at the middle of the port 113 then analysis of the connection of the port may find little to no effects of the port 113 and the connection thereof for electromigration analysis. However, if the net 114 and the block net 115 in the primitive/macro cell (block) 112 are not connected in the middle of the port 113 but are positioned some distances away from the middle of the port (such as provided in the illustration) failure to account for the parasitic effects of the portions of overlap (overlap area 117-118), and the path 119 between the portions overlapped may result in unintended effects, such as a chip that flags false positive or false negative EM violations, that fails prematurely, or never even works at all. The primitive/macro cell (block) 112 may comprise a simple block such as those known in the art as primitives (e.g. a block that does not itself include other blocks) or may comprise a more complicated block such as a macro cell (e.g. a block that includes one or more primitives). Furthermore, both blocks may include multiple ports for input (e.g. sinks) and/or output (e.g. sources) of signals. Additionally, overlap points may correspond to a net or trace on the same layer as the port, or overlap points may correspond to one or more vias that connect a trace on a different layer from the port. In some embodiments, an individual port is connected to multiple sinks or multiple sources or some combination thereof.

User station 110 includes or provides access to the analysis module 101. The user station 110 executes instructions for performing efficient and accurate signal electromigration analysis of digital-on-top designs with complex interface pin shapes according to some embodiments of the invention. The user station 110 comprises any type of computing station that is useable to operate or interface with the database 130. Examples of such user stations include workstations, personal computers, or remote computing terminals. The user station 110 comprises a display device, such as a display monitor, for displaying a user interface to users at the user station. The user station 110 also comprises one or more input devices for the user to provide operational control over the user station, such as a mouse or keyboard to manipulate a pointing object in a graphical user interface. In some embodiments, the graphical user interface includes tools for controlling and/or configuring an electromigration analysis module and/or visualization tools for illustrating how sets of configuration settings are applied to one or more ports of the blocks.

The system includes a database 130 which is illustrated as including design primitive/macro cell (block) data 131, design net data 133, design feature position data 135, design parasitics data 137, and electromigration (EM) analysis results 139. The database 130 could be a single database with one or more subsets within that database for the design primitive/macro cell (block) data 131, design net data 133, design feature position data 135, design parasitics data 137, and electromigration (EM) analysis results 139, as illustrated in the figure. However, in other embodiments the database could comprise multiple separate databases on different computing systems and/or in different locations connected via electronic communication links (e.g. wired and wireless networks). The system may further include database access modules for accessing and storing the data, whether stored at a single database or multiple databases.

The design primitive/macro cell (block) data 131 includes information related to design primitives and to macro cells used and/or available for use in a design being analyzed. The actual data itself is organizable in various manners including industry standard formats. For instance, a global table may be provided that includes entries that identify all the ports of the cells, the net(s) connected to those ports if any, the position of the instance, the parent cell of which the cell is an instance or and other relevant parameters. In some embodiments, instances may be represented by structs or as entries in a relational table whether solely for instances of the same parent cell or for all instance of all possible parent cells. In some embodiments, the block data 131 is provided separately from other data as shown in the illustrations. However, the block data may be stored in other arrangements such as combined with the design net data 133 and the design feature data 137. In some embodiments, the block data is embodied as a set of objects, as a relational database structure, or some combination thereof.

The design net data 133 includes information related to connections between the items identified by the block data 131. For example, a single net having one source and two sinks is represented by a label identifying the net (e.g. net201) three additional pieces of data representing the connections of that net to other elements (e.g. blocks and ports). In some embodiments, the net data 133 is provided separately from other data as shown in the illustrations. However, the net data may be stored in other arrangements such as combined with the block data 131 and the design feature data 137. In some embodiments, the net data is embodied as a set of objects, as a relational database structure, or some combination thereof.

The design feature position data 135 includes data representing the position of the block data 131 and the net data 135. For instance, in the case of a block instance the design feature position data 135 includes information comprising an origin point (e.g. x and y coordinate data) of the block instance and its orientation, and in the case of a net the design feature position data 135 includes information corresponding to location information corresponding to one or more areas that together make up the net. However, the design feature position data 135 may be stored in other arrangements such as combined with the block data 131 and the net data 133. In some embodiments, the design feature position data 135 is embodied as a set of objects, as a relational database structure, or some combination thereof.

The design parasitic data 137 represent parameters used for performing EM analysis and the EM circuit analysis results 139 represent the results of performing the EM circuit analysis. Both the design parasitic data 137 and the EM circuit analysis results 139 can be organized in a similar fashion to the design feature data. For instance, design parasitics data 137 can be associated with one or more segments of the nets and one or more segments of ports associated with blocks identified by the block data. The data may be represented in a series of relational database tables where parameters and the analysis results generated using that data are associated using one or more identifiers to the associated item. In some embodiments, the parasitics data corresponds to resistance, capacitance, and inductance data or some combination thereof.

The electromigration analysis module 150 as illustrated includes a primitive/macro cell (block) identifier 151, a net identifier 152, a block port(s) position/overlap and path mapper 155, and an EM (electromigration) analyzer 159. In some embodiments, the various components, or their functions, of the electromigration analysis module 150 are combined or separated into different components from those illustrated.

The primitive/macro cell (block) identifier 151 performs identification of blocks containing ports for processing, such as block 112. In some embodiments, the block identifier 151 operates on design primitive/macro cell (block) data 131 from the database 130 to identify one or more blocks having one or more ports for analysis. For example, the block identifier 151 processes the block data 131 to identify the instances of one or more blocks used in a design (e.g. chip). The block identification data may then be passed to a component for identifying corresponding nets and for determining areas of overlap and mapping paths between them. Furthermore, in some embodiments the blocks are identified based on at least one or more user inputs, blocks identified as critical due to their presence along a critical path found as a result of timing or other analysis, or blocks identified for processing based on one or more data flags already present in the block data 131. In some embodiments, the identified blocks are pass by reference (e.g. one or more links and ranges to a table, list, or other dataset) or are passed individually or as groups or sets of identified blocks. For instance, in some circumstances circuits are more efficiently analyzed through parallel processing such as in a multiprocessor/multicore system where a first processor/core performs the block identification and a second processor/core performs the net identification (see net identifier 152) where the identified blocks, or reference thereof, are passed to an available secondary processor/core for performing net identification.

The net identifier 152 performs identification of nets corresponding to the port(s) of the identified blocks. In some embodiments, this comprises retrieval of corresponding design net data 133 from the database 130. In some embodiments, the net data is mapped to the instances of the blocks identified from the block data 131. In some embodiments, the net identifier 152 uses position information to determine overlap between an identified block and a net for identification. Furthermore, in some embodiments nets are identified and associated with specific ports of identified blocks— e.g. ports connected to nets for clocking, data transmission, control signals or even power and ground connections, and in some cases the identification of the specific port and net selects only some of the ports and nets for electromigration analysis. Regardless of how the nets are identified data representing those nets is passed to the block port(s) position/overlap and path mapper 155 for processing. In some embodiments, the identified nets are pass by reference (e.g. one or more links and ranges to a table, list, or other dataset) or is passed individually or as groups or sets of identified nets. For instance, in some circumstances circuits are more efficiently analyzed through parallel processing such as in a multiprocessor/multicore system as discussed in regard to the block identifier 151, and where identified nets and blocks or reference thereof is passed to an available third processor/core for performing position/overlap and path mapping.

The block port(s) position/overlap mapper 155 performs identification of the areas of overlap between ports (e.g. port 113) and nets (e.g. net 114) and between port and block nets (e.g. block net 115) and the paths between the areas of overlap (e.g. path 119). The mapper 155 operates on the block data identified by the block identifier 151, the net data identified by the net identifier 152 and design feature position data 135. By way of example, the mapper 155 may first identify a port for processing (e.g. port 113), nets connected to the port (e.g. net 114), and block nets connected to the port (e.g. block net 115). Once the connections to the port are identified the mapper can determine the areas of overlap between the nets and the ports (e.g. overlap area 117) and the areas of overlap between the block nets and the ports (e.g. overlap area 118) using the design feature position data 135. Finally, the mapper can identify the paths between the areas of overlap (e.g. path 119).

The electromigration (EM) analyzer 159 may analyzed the circuit using at least the output from the mapper 155 and store the analysis results in the EM circuit analysis results 139. For example, design parasitics data 137 can be combined with the design feature position data 135 and the output of the mapper 155 to perform EM analysis on the circuit including EM analysis that accounts for the EM effects of the overlap and path areas identified.

Figure 2:
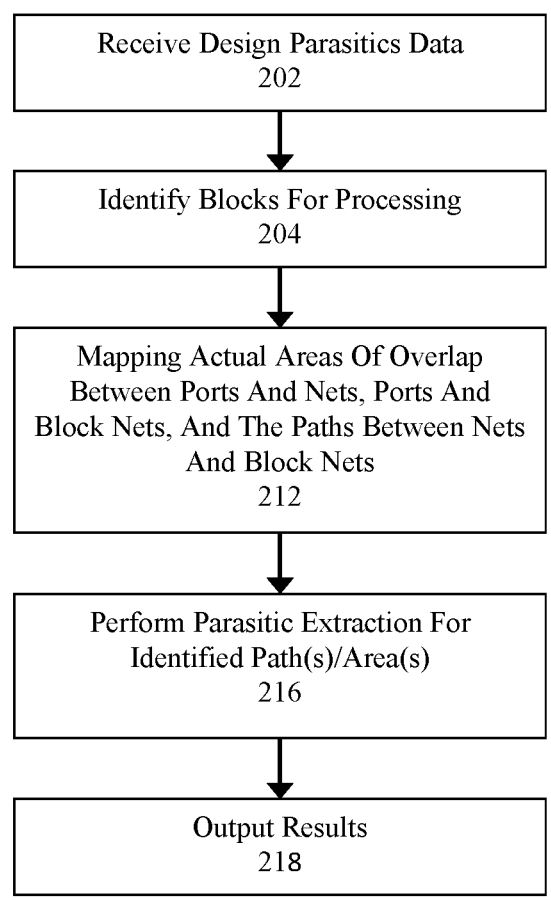
FIG. 2 illustrates a flow of an approach for efficient and accurate signal electromigration analysis of digital-on-top designs with complex interface pin shapes.

FIG. 2 illustrates a flow of an approach for efficient and accurate signal electromigration analysis of digital-on-top designs with complex interface pin shapes according to some embodiments of the invention.

At 202 the design parasitics data is received for a design to be analyzed, and at 204 blocks for processing are identified. In some embodiments, the blocks for processing are all blocks within a single design. In some embodiments, the blocks identified for processing comprise a subset of blocks within the design. For instance, the subset of blocks comprise blocks identified by a user, blocks identified as critical blocks, blocks connected to a critical signal path, blocks connected a critical net, or any combination thereof.

After the parasitic data is received and blocks are identified for processing mapping can be performed at 212. Mapping determines the actual areas of overlap between ports and nets, ports and block nets, and the paths between the areas overlapped by the nets and block nets. For example, data corresponding to the blocks the position of the ports of the blocks and nets and block nets connected thereto can be mapped to each other to determine areas or regions in which they overlap and to determine the paths along the ports that connect the areas of overlap. One particular approach will be discussed further in regard to FIG. 3 below.

Extraction of the parasitic data can be performed for the identified paths and overlapped areas such as by using parasitic extraction techniques as known in the art and the results can be output at 218.

Figure 3:
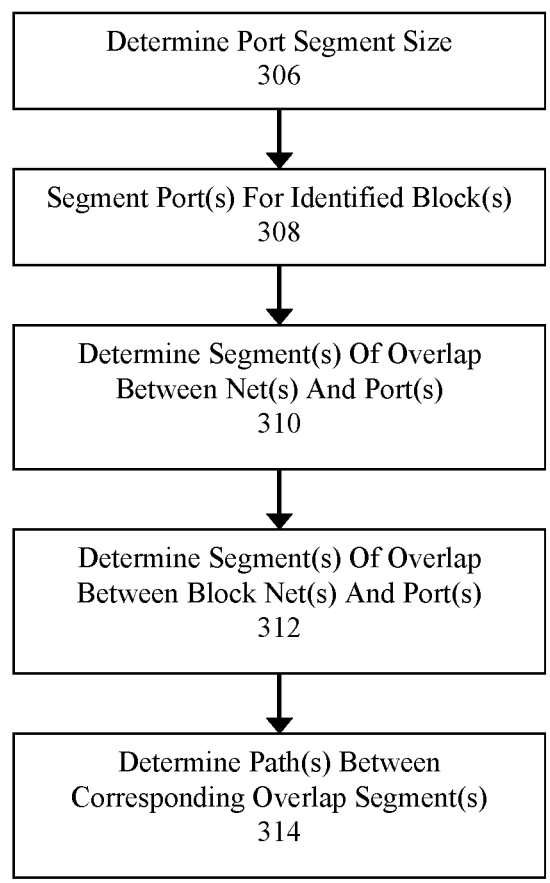
FIG. 3 illustrates a flow of an approach for the step of mapping illustrated in FIG. 2.

FIG. 3 illustrates a flow of an approach for the step of mapping discussed above in regard to 212 illustrated in FIG.

2. The illustrated approach comprises a technique for approximating the relationship between ports, nets, and block nets. Specifically, FIG. 3 provides a segment based approach for estimating the correspondence between the ports, the nets, and the block nets.

The process starts at 306 where a port segment size is determined. The segment size may be determined in any number of ways such as based of a user input, a database entry specifying a global port size, or based on any other parameter or calculation thereof. After the segment size is identified the ports of the blocks identified are segmented at 308 using the segment sized identified in the previous step—e.g. divided into a plurality of segments having dimensions equal to the segment size.

At 310 port segments that overlap, whether fully or partially, with one or more nets are identified. The areas identified may not be 100% overlapped with the nets but none the less serve to estimate the overlap and to decrease the processing load—e.g. some segments may only be partially overlapped. Furthermore, in some embodiments the size of the segment corresponds to a level of accuracy where a decrease in segment size corresponds to an increase in accuracy and an increase in segment size corresponds to a decrease in accuracy. Similarly, the same technique is used to determine the overlapping segments between the block nets and the port at 312. Finally, the segments between the overlapped segments can be identified as the path between the overlap areas at 314, such as by identifying horizontal and vertical coordinates of the overlapped segments and by selecting the segments that are between the identified horizontal and vertical coordinates. In some embodiments, a threshold of overlap is used in order to determine whether a segment is overlapped, e.g. areas with an overlap of 25% or less may be excluded from analysis.

FIGS. 4A-E provide an illustrative example of the approach for efficient and accurate signal electromigration analysis of digital-on-top designs with complex interface pin shapes according to some embodiments.

Figure 4A:
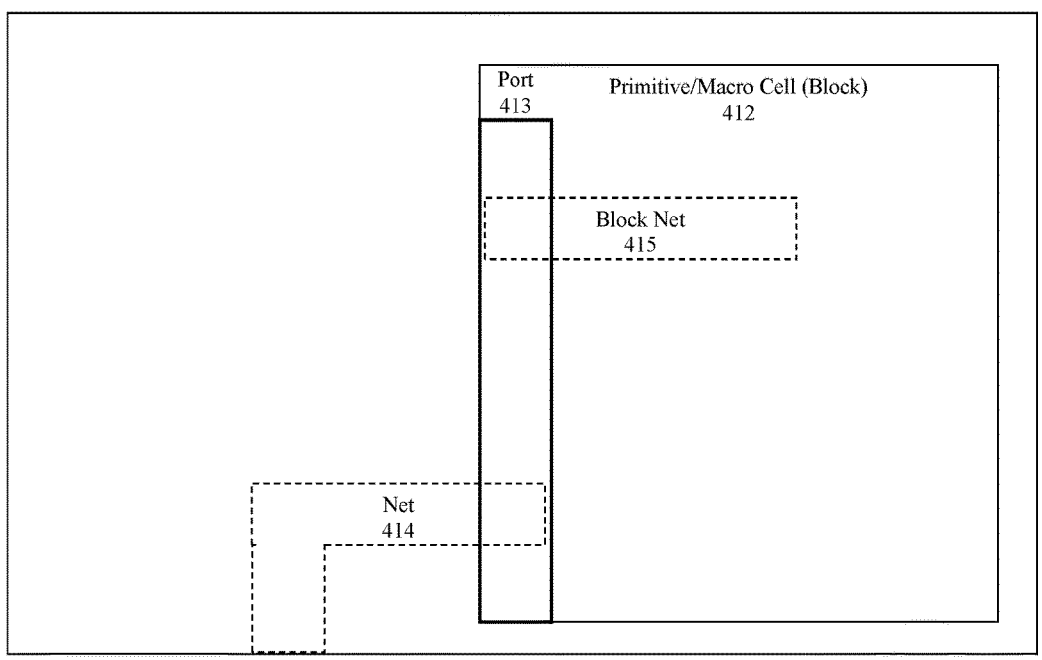
FIGS. 4A-E provide an illustrative example of the approach for efficient and accurate signal electromigration analysis of digital-on-top designs with complex interface pin shapes.

FIG. 4A provides an illustration 411 similar to that presented in FIG. 1 including a primitive/macro cell (block) 412 connected to a net 414. The net 411 is connected to the port 413 within the block 412, and the port 415 is in turn connected to block net 415.

Figure 4B:
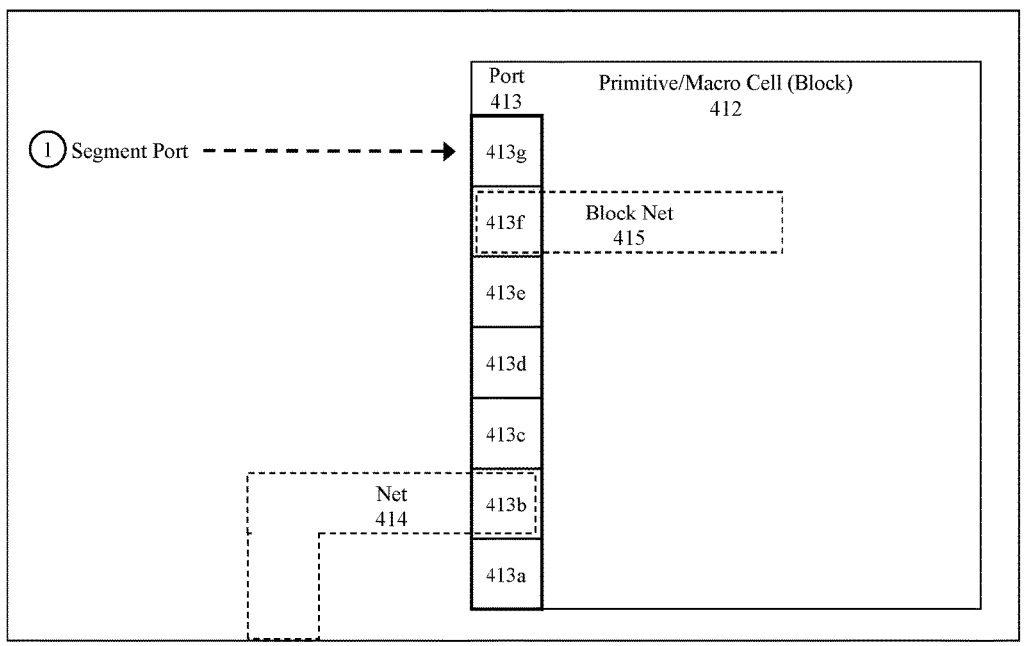

FIG. 4B illustrates segmenting of the port 413 disclosed in FIG. 4A. Specifically, port 413 is segmented into segments 413a-g. The segments may have dimensions that are equal, e.g. height and width are equal, or may have segments with different dimensions of a coordinate space, e.g. height and width are not equal. Furthermore, in some embodiments the coordinates or axis may differ.

Figure 4C:
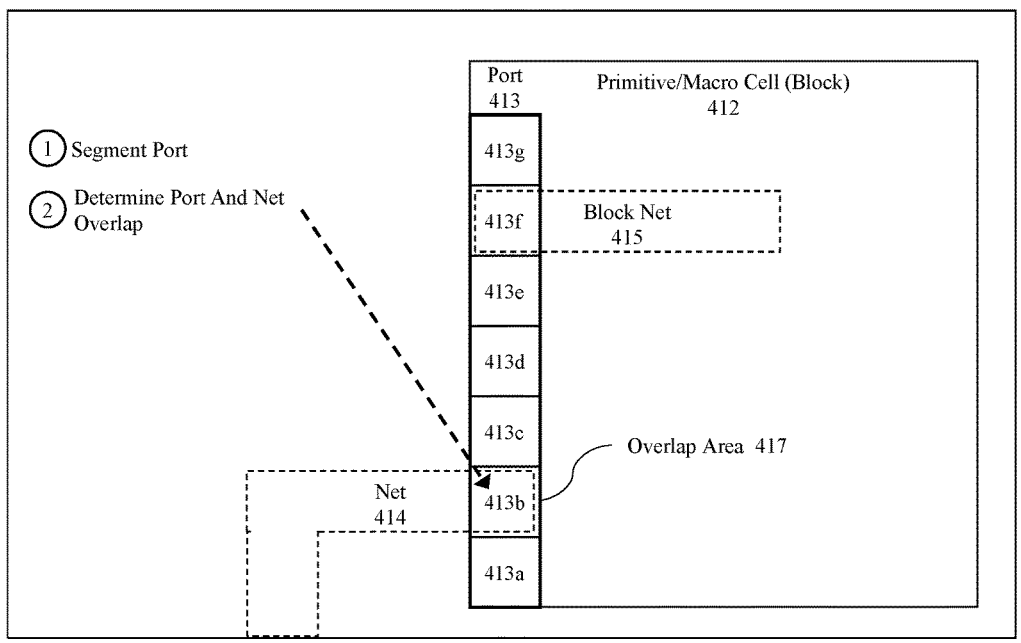
Figure 4D:
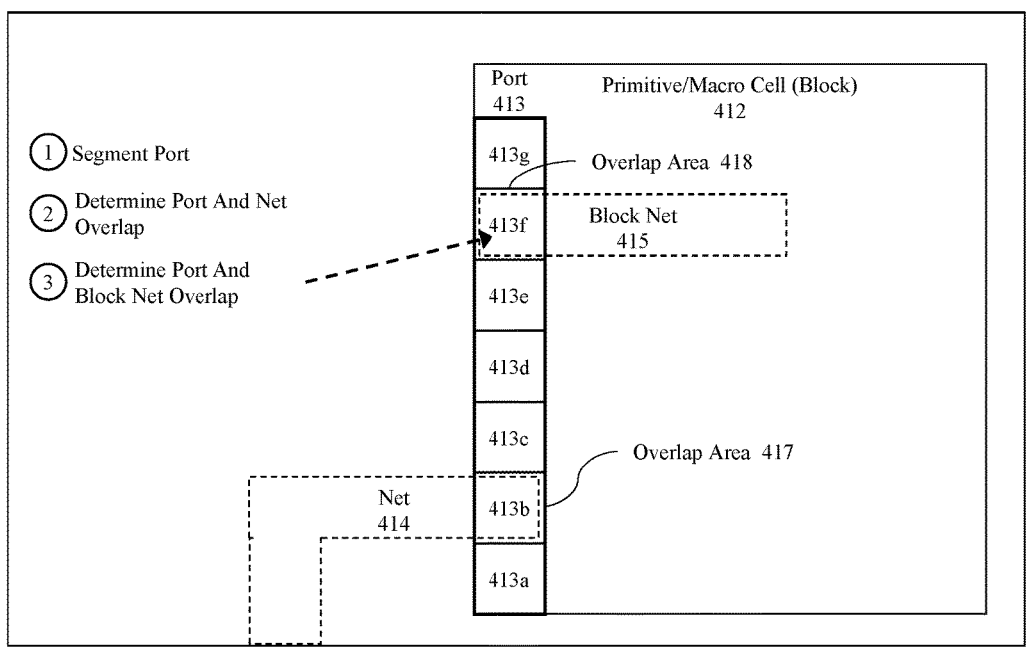

FIG. 4C illustrates a determination of the overlap area 417 of the net 414 with the port 413. As illustrated the area of overlap 417 corresponds to segment 413b. However, in other embodiments the areas of overlap may correspond to multiple segments and the overlap may not be complete (e.g. only half of an area corresponding to a segment is overlapped even though the entire segment is treated as overlapped). FIG. 4D illustrates the determination of overlap area 418 of the block net 415 which is performed as discussed with regard to the overlap area 417.

Figure 4E:
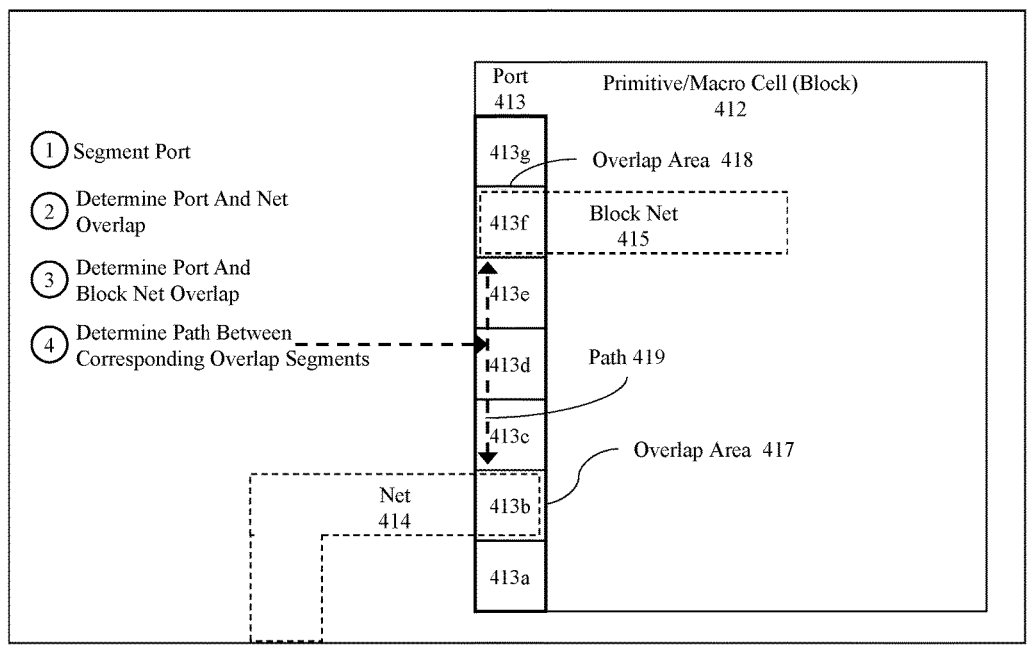

Finally, FIG. 4E illustrates determination of the path between the corresponding overlap segments (e.g. overlap area 417 and 418). As illustrated, the areas of overlap, segment 413b and 413f, correspond to net 414 and block net 415 respectively, and the path between them corresponds to 413c-e.

Figure 5:
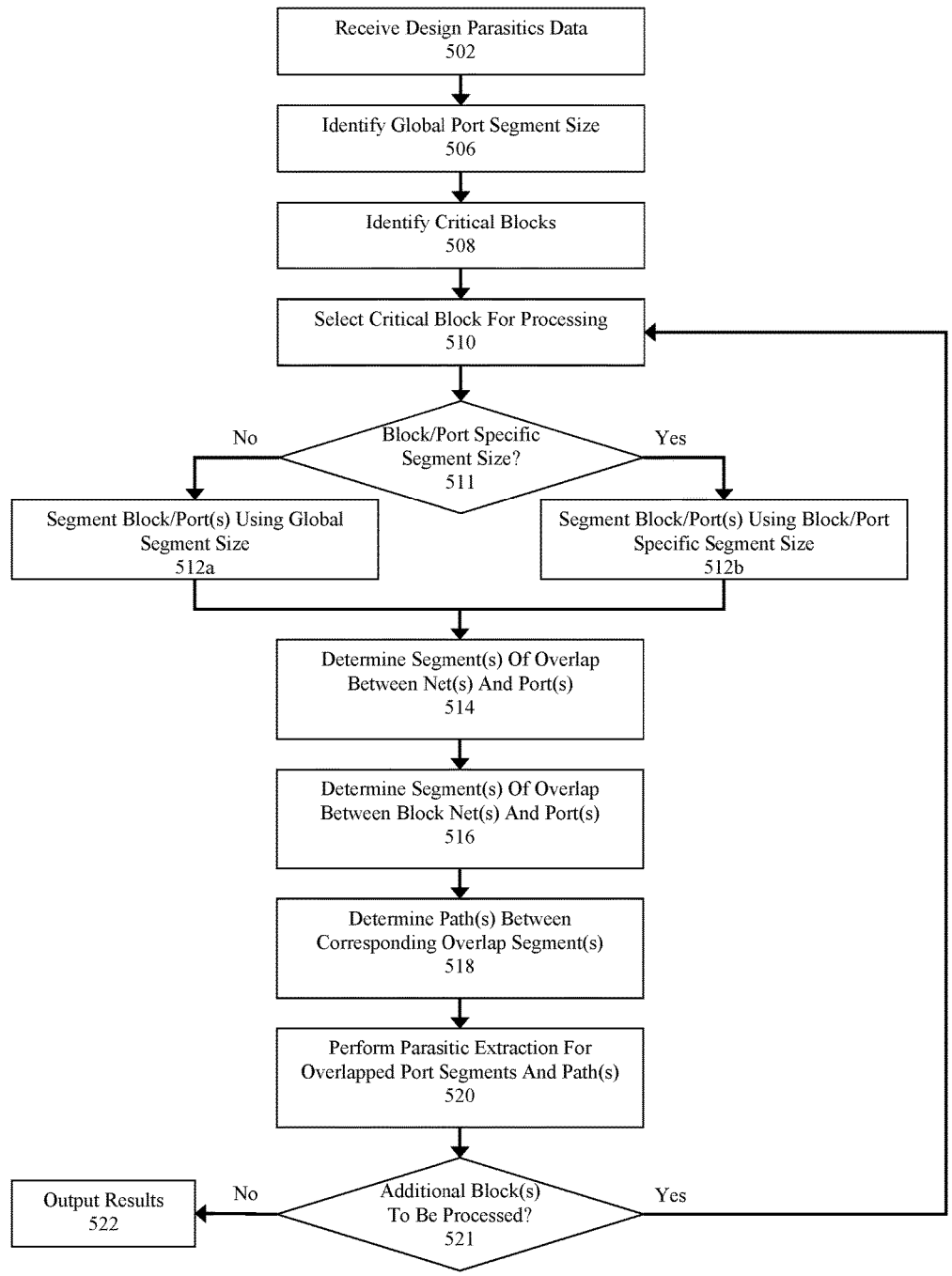
FIG. 5 illustrates a flow of an alternative approach for efficient and accurate signal electromigration analysis of digital-on-top designs with complex interface pin shapes.

FIG. 5 illustrates a flow of an alternative approach for efficient and accurate signal electromigration analysis of digital-on-top designs with complex interface pin shapes according to some embodiments. The alternative approach is directed towards processing only critical blocks and using either a global segment size or a block/port specific segment size.

The process starts at 502 where the design parasitics data is received as discussed previously in regard to 202, and continues at 506 where a global port segment size is identified as discussed pursuant to 308 above.

At 508 critical blocks are identified. The critical blocks may be identified based on user input, based on identification of blocks as being on a path identified as critical or based on some other criteria, or any combination thereof.

Once the critical blocks are identified at 508 the process enters a loop at 510 where a first critical block is selected and processed before selecting another critical block for processing. Each selected critical block is processed by first determining whether there is a block/port specific segment size at 511. If there is no block specific segment size the block/port(s) are segmented using the global specific segment size at 512a. However, if there is a block/port specific segment size then the block/port(s) are segmented using the block/port specific segment size at 512b. In some embodiments, different ports may have different segment sizes even within the same block, such that one port may have a port specific segment size and another port may have a block specific segment size. Furthermore, a hierarchy of segment sizes may be utilized where a global segment size is the default segment size, a block specific segment size overrules a global segment size, and a port specific segment size overrules both a block specific segment size and a global segment size.

Once the segment size is determined and the port(s) are segmented for the block the areas of overlap can be identified between the nets and the port(s) at 514, between the block nets and the port(s) at 516, and the path(s) between corresponding overlap segments can be identified at 520 as previously discussed.

Finally, at 521 a determination is made as to whether there are any additional blocks to be processed before outputting results at 522. If there are additional blocks to be processed the process returns to 510 where an unprocessed block is selected for processing. If there are no additional blocks to be processed the results can be output at 522.

FIGS. 6A-L provide an illustrative example of the alternative approach for efficient and accurate signal electromigration analysis of digital-on-top designs with complex interface pin shapes.

Figure 6A:
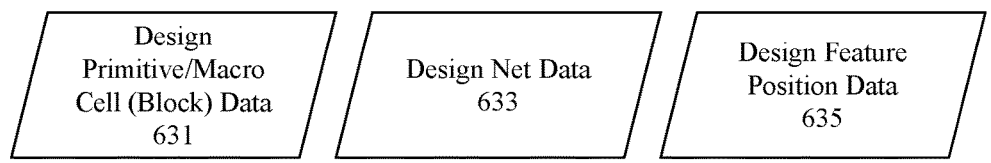
FIGS. 6A-M provide an illustrative example of the alternative approach for efficient and accurate signal electromigration analysis of digital-on-top designs with complex interface pin shapes.

FIG. 6A illustrates some initial data corresponding to data discussed previously including design primitive/macro cell (block) data 631 corresponding to 131, design net data 633 corresponding to 133, and design feature position data 635 corresponding to 135. This data corresponds generally to the initial design data upon which the EM analysis will be performed.

Figure 6B:
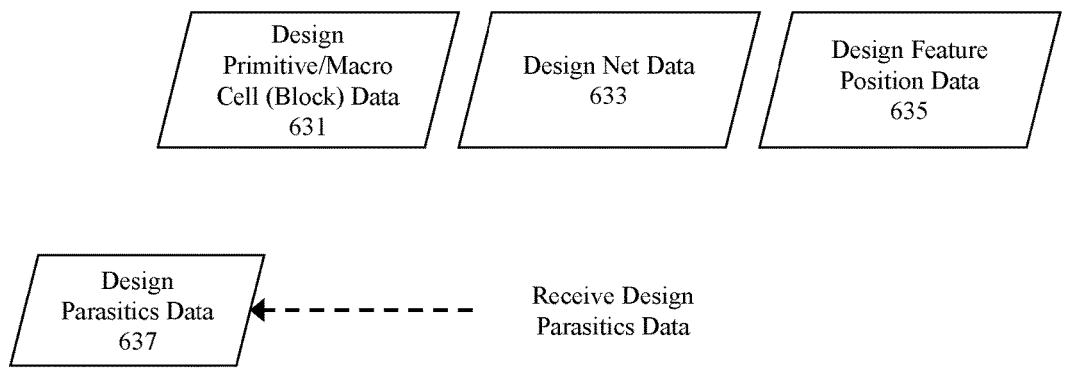
Figure 6C:
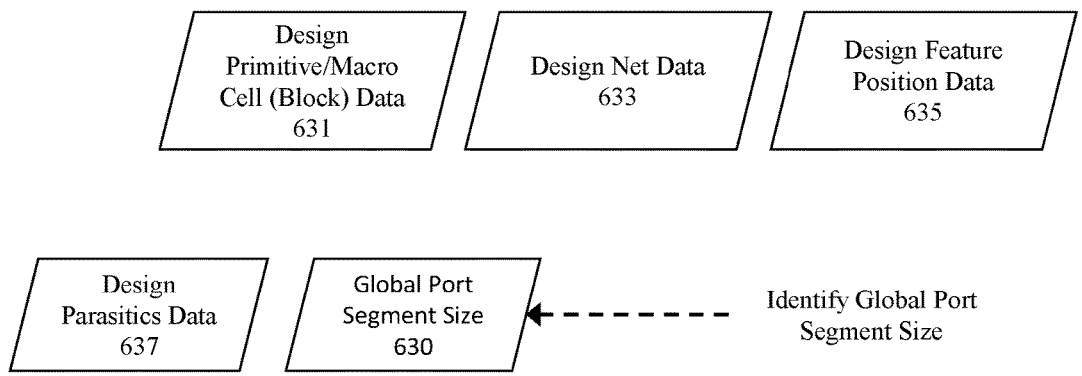
Figure 6D:
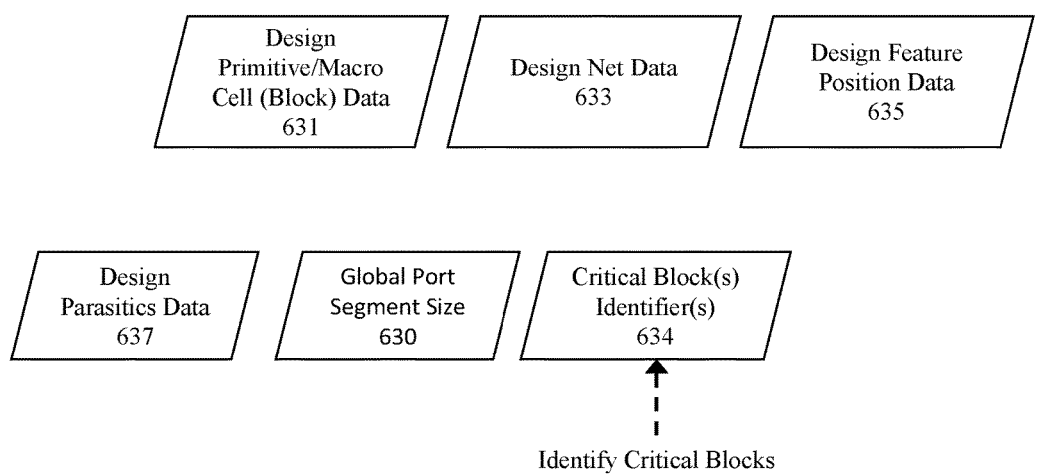

FIGS. 6B-D correspond to setup steps corresponding to parameter collection. FIG. 6B illustrates the receipt of design parasitics data 637 corresponding to design parasitics data 137, which represent parasitics data such as resistance, capacitance, and inductance. FIG. 6C illustrates the identification of a global port segment size represented at by global port segment size 630. FIG. 6D illustrates the identification of critical blocks such as through identification of critical block(s) identifier(s) 634.

Figure 6E:
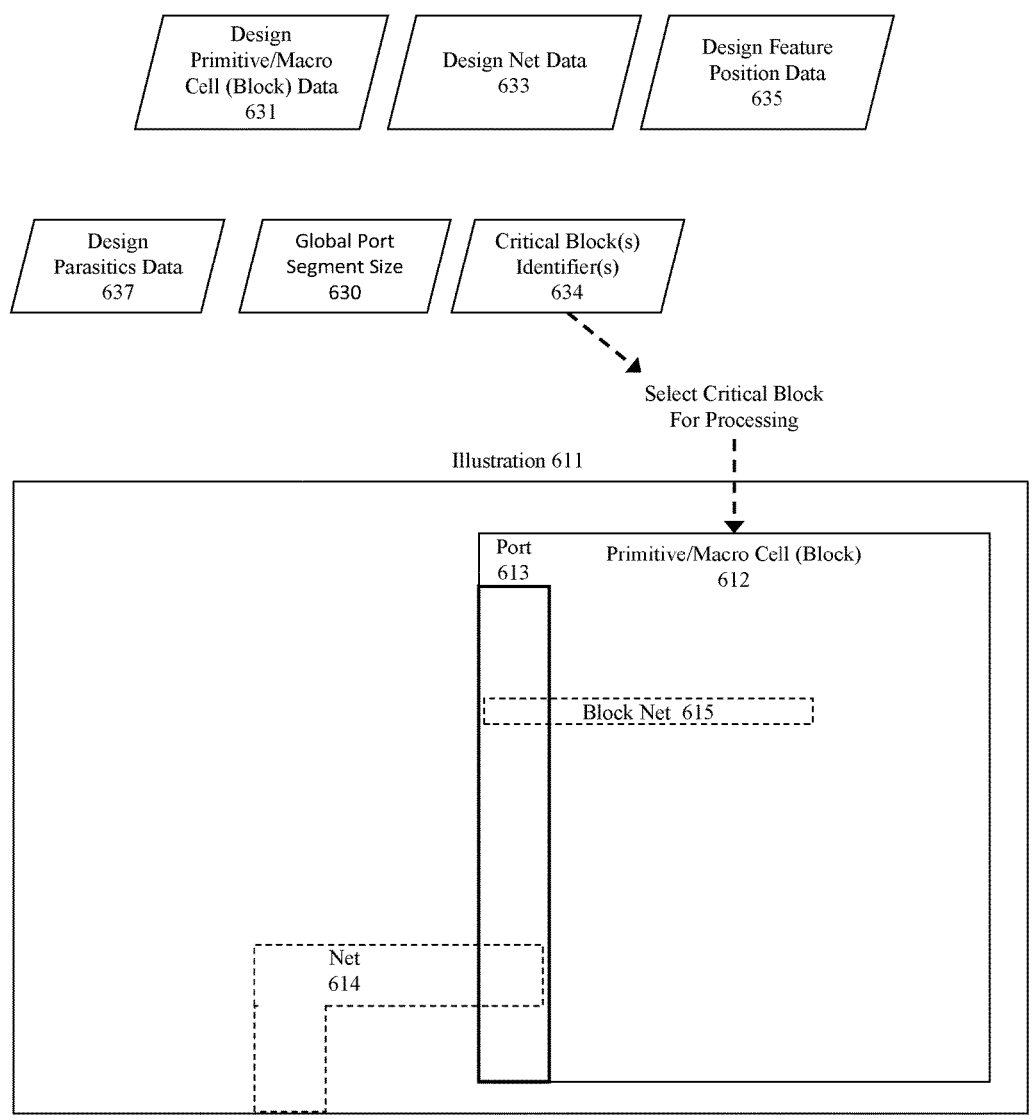

FIG. 6E adds an illustration 611 displaying a selected critical block for processing comprising a net 614 and primitive/macro cell (block) 612 having a port 613 and a block net 615. However, the illustration is merely for purposes of explanation as the selection and processing would not normally be displayed visually to a user.

Figure 6F:
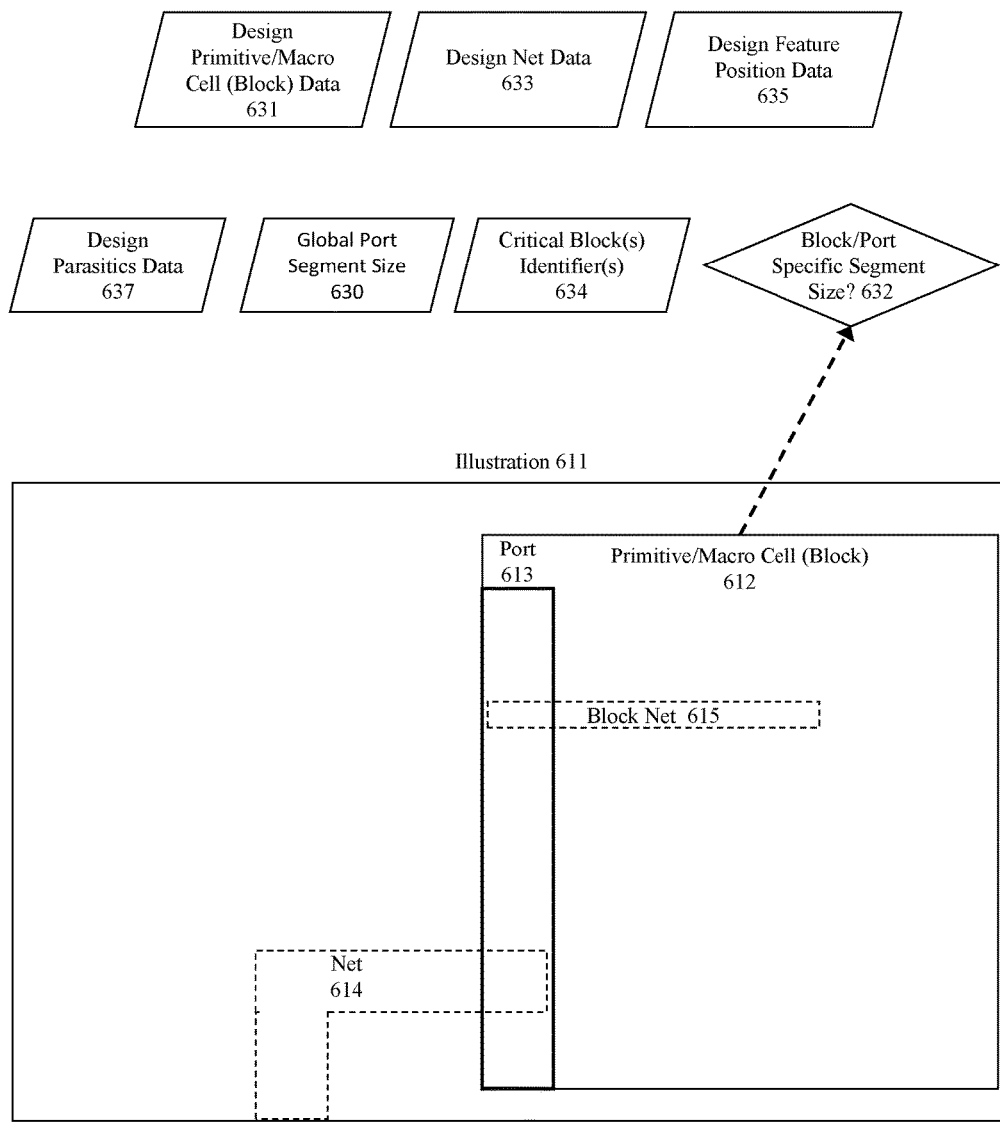
Figure 6G:
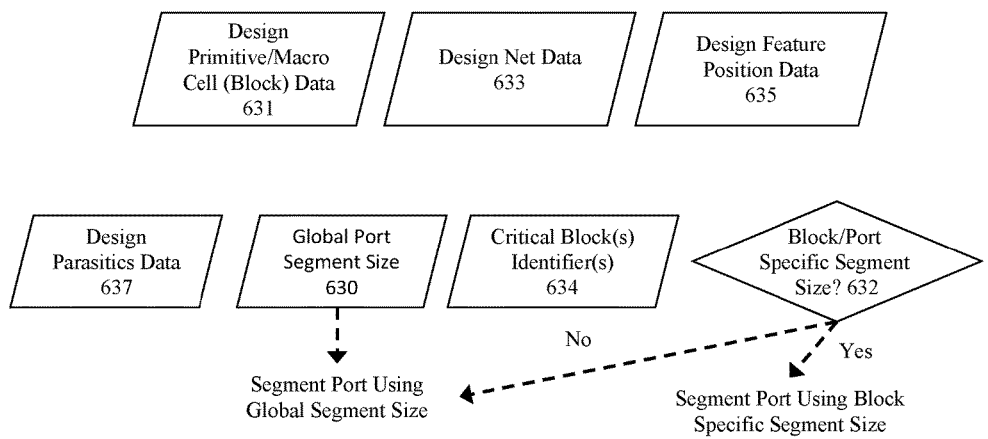
Figure 6G:
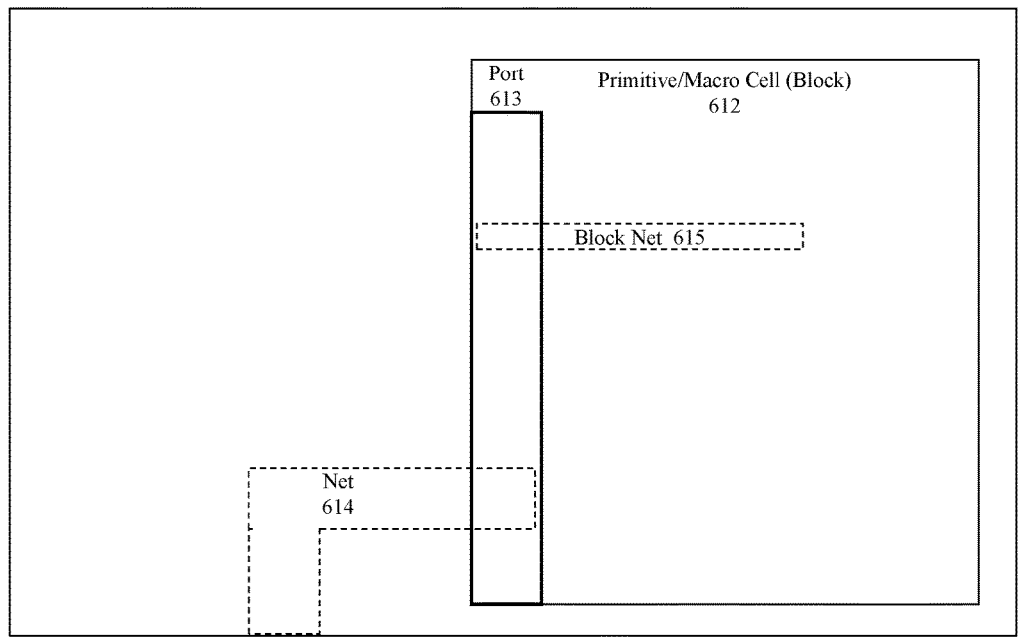
Figure 6H:
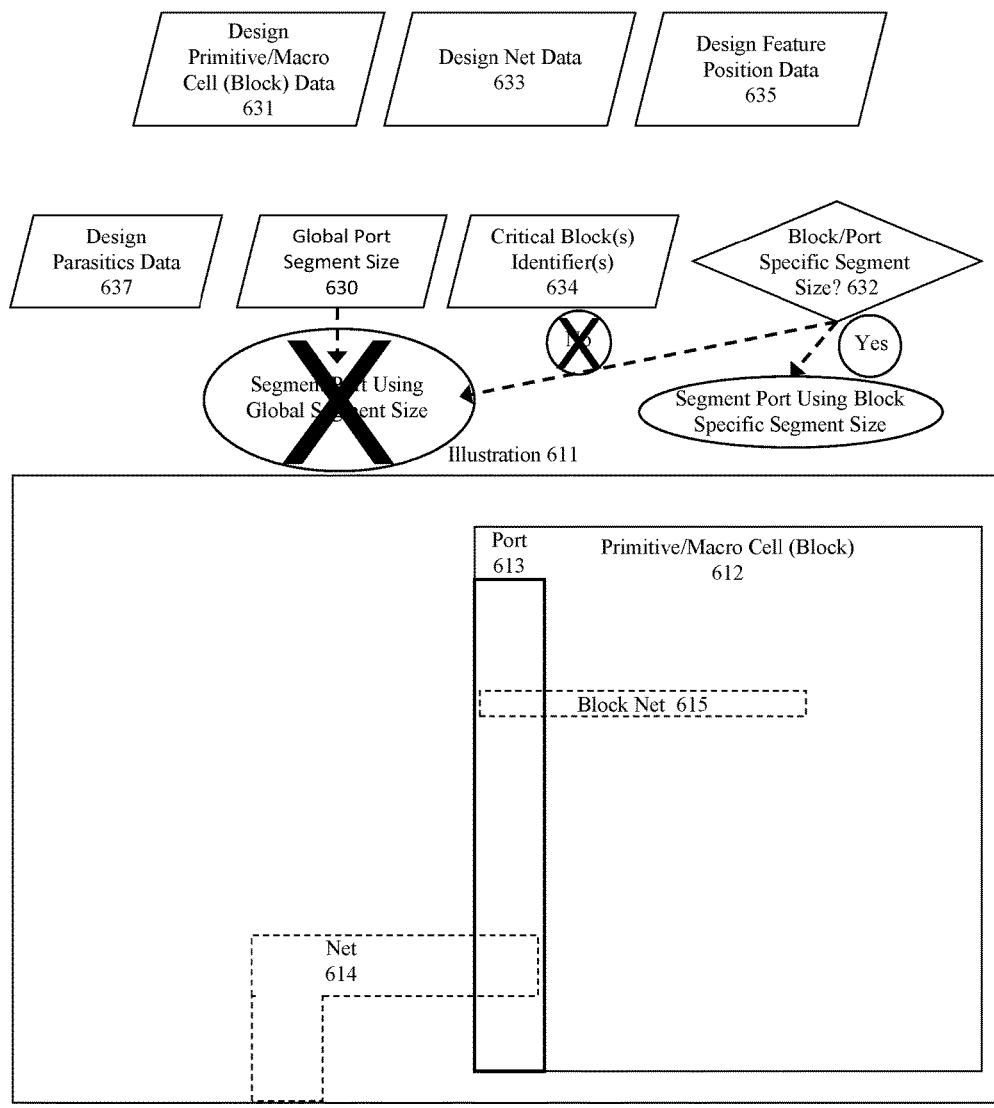
Figure 6I:
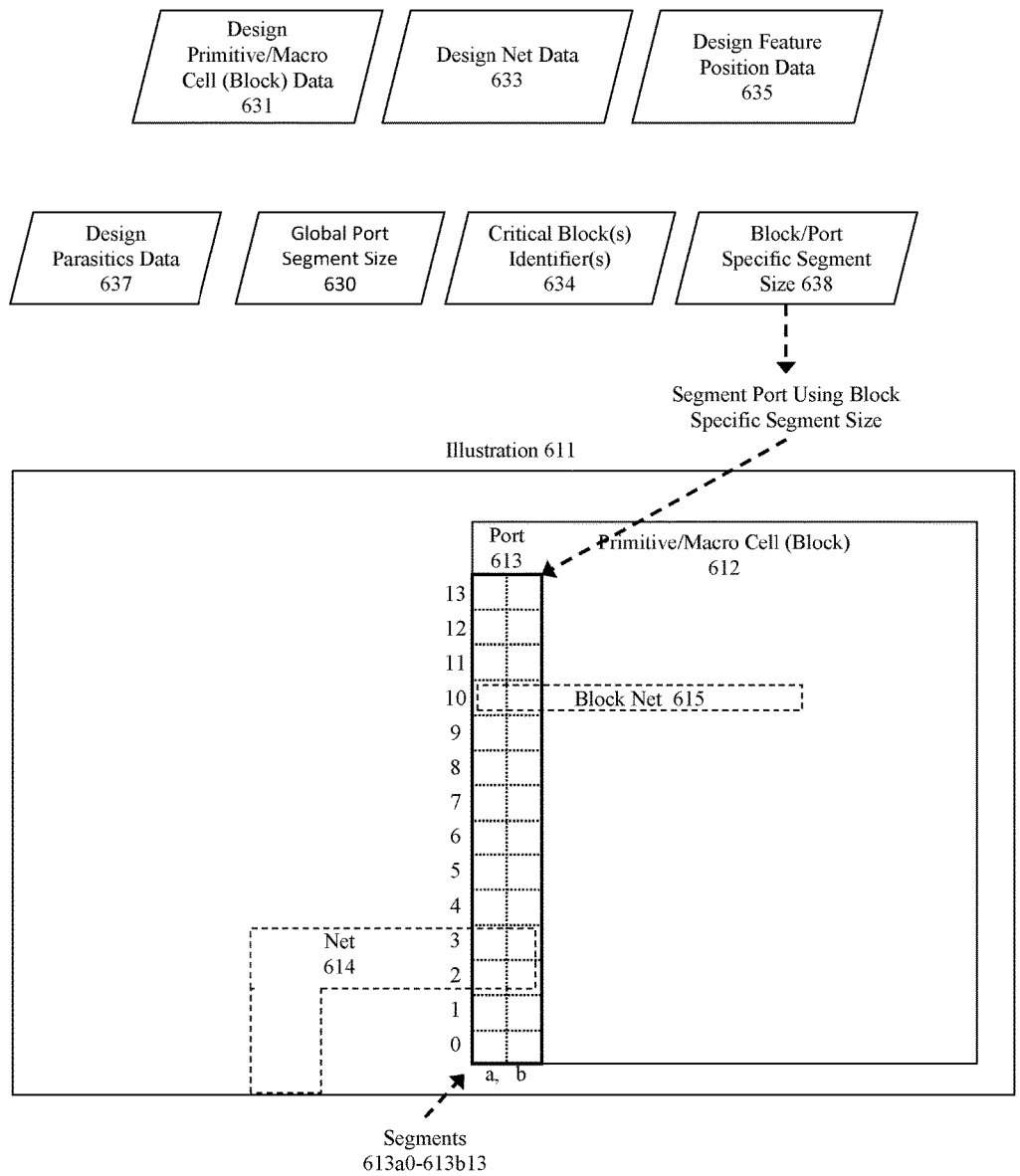

FIG. 6F shows a determination of whether a block/port specific segment size at 623. FIG. 6G illustrates two possible outcomes of the determination. A first possible result, determining that there is no block/port specific segment size at 632 in which case the global port segment size 630 should be used for segmenting the ports, and a second possible result determining that there is a block/port specific segment size at 632 in which case the block/port specific segment size (see FIG. 6I item 638) should be used for segmenting the ports. FIG. 6H illustrates the actual result for the determination, a block/port specific segment size for segmenting the port(s). Finally, FIG. 6I illustrates the segmenting of the port 613 into a plurality of segments 613a0-613b13 using the block/port specific segment size.

Figure 6J:
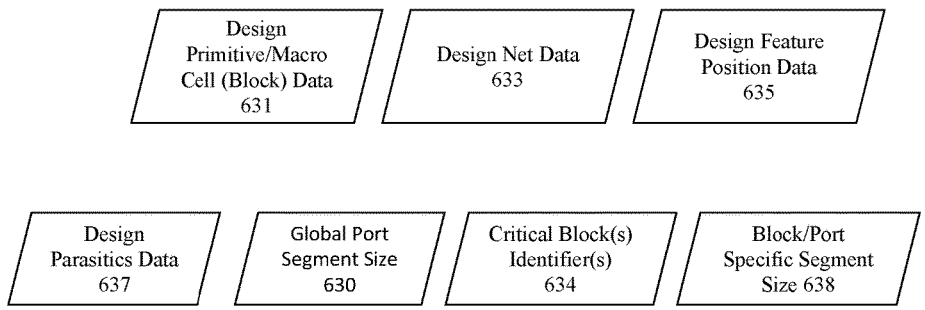
Figure 6J:
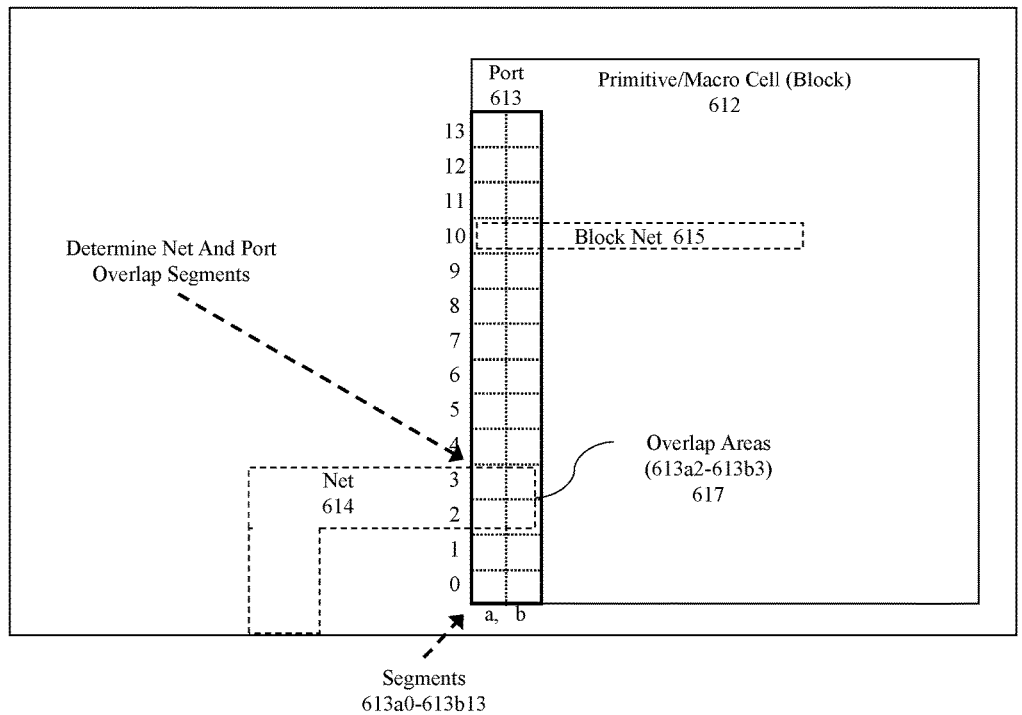
Figure 6K:
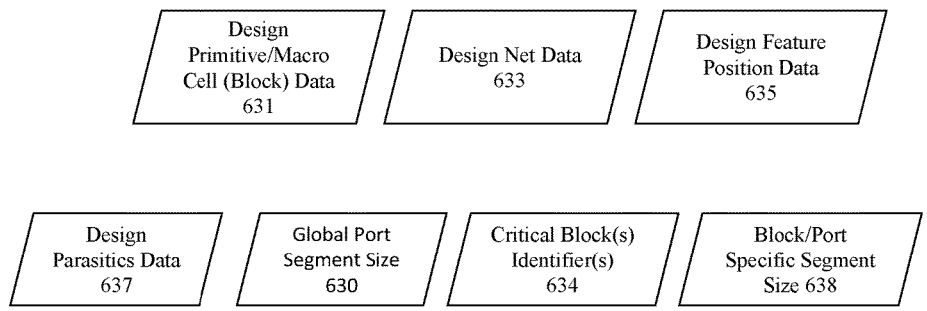
Figure 6K:
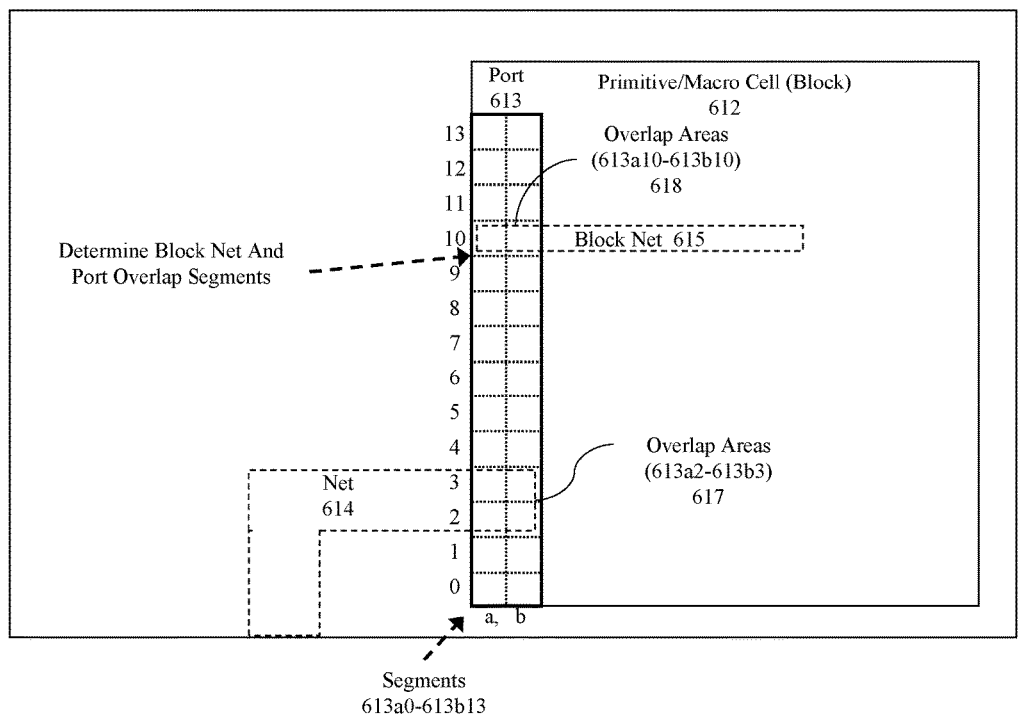
Figure 6L:
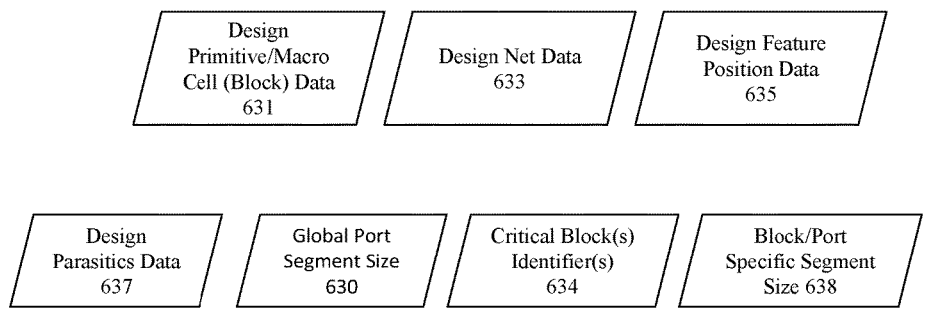
Figure 6L:
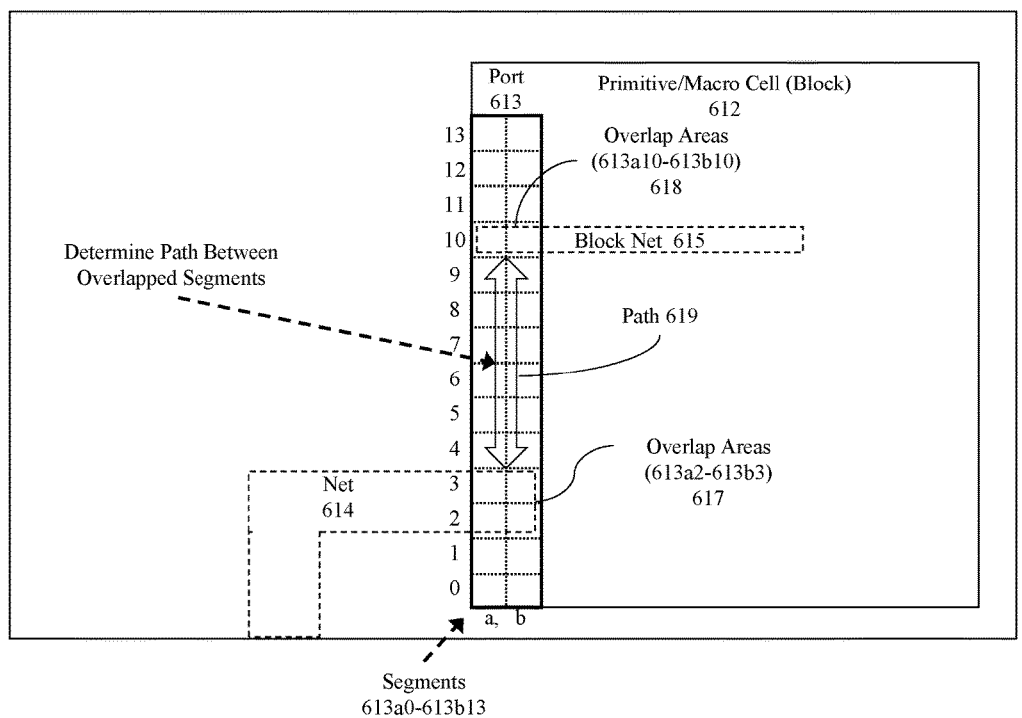

The mapping of the segments to corresponding overlap areas and the path is illustrated in FIG. 6J-L. FIG. 6J illustrates a determination of the net and port overlap segments as overlap areas (613a2-613b3) 617. Similarly, FIG. 6K illustrates a determination of the block net and port overlap segments as overlap areas (613a10-613b10) 618. Finally, FIG. 6L illustrates the identification of the path between the overlap areas 617 and 618.

Figure 6M:
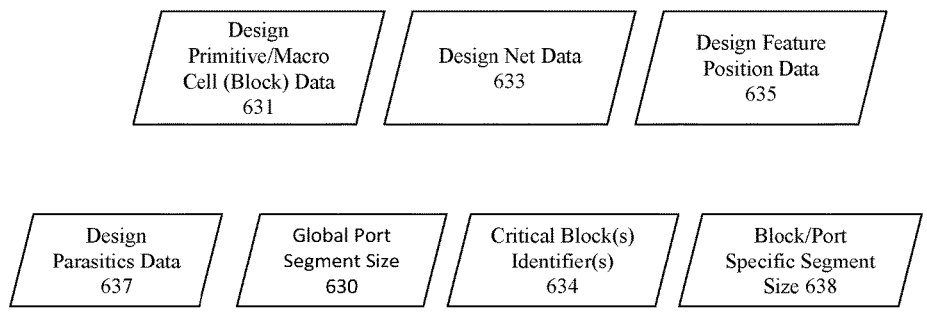
Figure 6M:
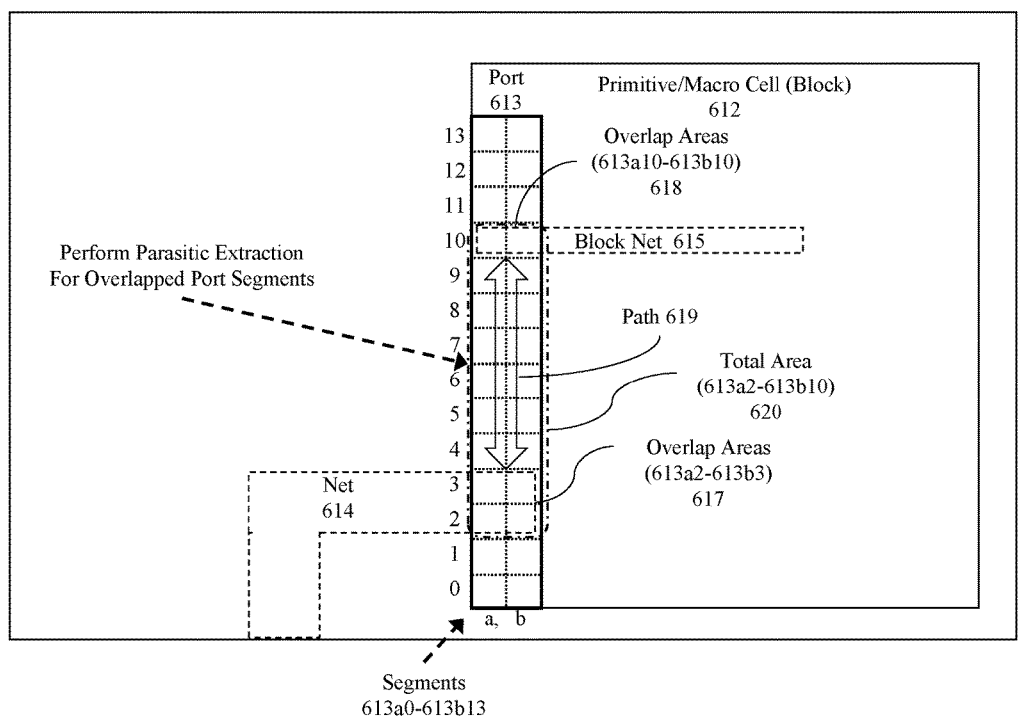

FIG. 6M illustrates the final determined area of the block/port for performing EM analysis identified as total area 620 and corresponding to segments 613a2-613b10.

System Architecture Overview

Figure 7:
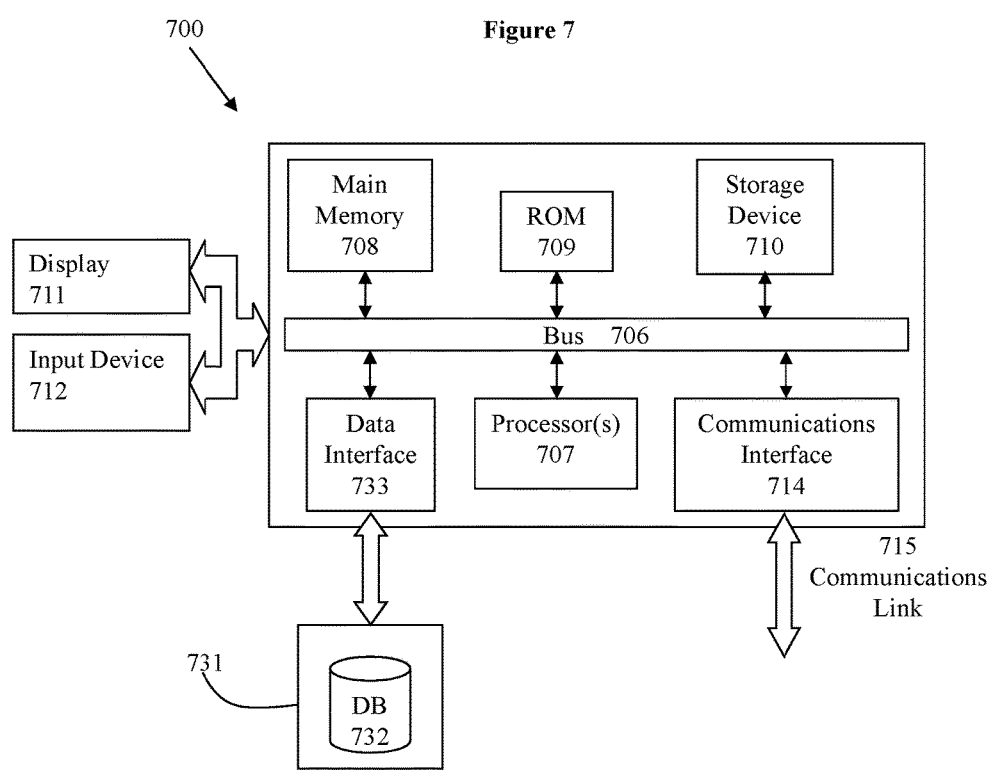
FIG. 7 shows an architecture of an example computing system with which the invention may be implemented.

FIG. 7 shows an architecture of an example computing system with which the invention may be implemented. Computer system 700 includes a bus 706 or other communication mechanism for communicating information, which interconnects subsystems and devices, such as processor 707, system memory 708 (e.g., RAM), static storage device 709 (e.g., ROM), disk drive 710 (e.g., magnetic or optical), communication interface 714 (e.g., modem or Ethernet card), display 711 (e.g., CRT or LCD), input device 712 (e.g., keyboard), and cursor control.

According to one embodiment of the invention, computer system 700 performs specific operations by processor 707 executing one or more sequences of one or more instructions contained in system memory 708. Such instructions may be read into system memory 708 from another computer readable/usable medium, such as static storage device 709 or disk drive 710. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 700. According to other embodiments of the invention, two or more computer systems 700 coupled by communication link 715 (e.g., LAN, PTSN, or wireless network) may perform the sequence of instructions required to practice the invention in coordination with one another.

Computer system 700 may transmit and receive messages, data, and instructions, including program, i.e., application code, through communication link 715 and communication interface 714. Received program code may be executed by processor 707 as it is received, and/or stored in disk drive 710, or other non-volatile storage for later execution. Computer system 700 may communicate through a data interface 733 to a database 732 on an external storage device 731.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for performing electromigration analysis corresponding to interface pin shapes, comprising:
   receiving design parasitics data;
   identifying a block for processing, the block comprising a primitive cell or macro cell and having one or more ports, the one or more ports comprising an area for connecting an external net to an internal net, the external net being external to the block, and the internal net being internal to the block;
   mapping a port of the block to the internal net and the external net, comprising:
      determining a first area of overlap between the port and the external net,
      determining a second area of overlap between the port and the internal net, and
      determining an area of the port corresponding to a signal path between the first area of overlap and the second area of overlap; and
   performing parasitic extraction for at least the first area of overlap, the second area of overlap, or the area between the first area of overlap and the second area of overlap.

2. The method of claim 1, wherein mapping the port of the block to the internal net and the external net, further comprises determining a port segment size and segmenting the port into a plurality of segments having dimensions corresponding to the port segment size.

3. The method of claim 2, wherein determining the first area of overlap between the port and the external net comprises identifying one or more segments in which the port and the external net overlap.

4. The method of claim 2, wherein determining the second area of overlap between the port and the internal net comprises identifying one or more segments in which the port and the internal net overlap.

5. The method of claim 2, wherein determining the area corresponding to the signal path between the first area of overlap and the second area of overlap comprises identifying one or more segments between the first area of overlap and the second area of overlap.

6. The method of claim 2, wherein the block identified for processing comprises a critical block.

7. The method of claim 2, wherein the port segment size comprises a global segment size, a block specific segment size, or a port specific segment size.

8. A non-transitory computer readable medium comprising a sequence of instructions which, when executed by a processor, cause the processor to execute a process for performing electromigration analysis corresponding to interface pin shapes, the process comprising:
 receiving design parasitics data;
 identifying a block for processing, the block comprising a primitive cell or macro cell and having one or more ports, the one or more ports comprising an area for connecting an external net to an internal net, the external net being external to the block, and the internal net being internal to the block;
 mapping a port of the block to the internal net and the external net, comprising:
  determining a first area of overlap between the port and the external net of the nets,
  determining a second area of overlap between the port and the internal net, and
  determining an area of the port corresponding to a signal path between the first area of overlap and the second area of overlap; and
 performing parasitic extraction for at least the first area of overlap, the second area of overlap, or the area between the first area of overlap and the second area of overlap.

9. The computer readable medium of claim 8, wherein mapping the port of the block to the internal net and the external net, further comprises determining a port segment size and segmenting the port into a plurality of segments having dimensions corresponding to the port segment size.

10. The computer readable medium of claim 9, wherein determining the first area of overlap between the port and the external net comprises identifying one or more segments in which the port and the external net overlap.

11. The computer readable medium of claim 9, wherein determining the second area of overlap between the port and the internal net comprises identifying one or more segments in which the port and the internal net overlap.

12. The computer readable medium of claim 9, wherein determining the area corresponding to the signal path between the first area of overlap and the second area of overlap comprises identifying one or more segments between the first area of overlap and the second area of overlap.

13. The computer readable medium of claim 9, wherein the block identified for processing comprises a critical block.

14. The computer readable medium of claim 9, wherein the port segment size comprises a global segment size, a block specific segment size, or a port specific segment size.

15. A system for performing electromigration analysis corresponding to interface pin shapes, comprising:
 a memory for storing a sequence of instructions; and
 a processor which performs the following actions when executing the sequence of instructions:
  receiving design parasitics data;
  identifying a block for processing, the block comprising a primitive cell or macro cell and having one or more ports, the one or more ports comprising an area for connecting an external net to an internal net, the external net being external to the block, and the internal net being internal to the block;
  mapping a port of the block to the internal net and the external net, comprising:
   determining a first area of overlap between the port and the external net,
   determining a second area of overlap between the port and the internal net, and
   determining an area of the port corresponding to a signal path between the first area of overlap and the second area of overlap; and
  performing parasitic extraction for at least the first area of overlap, the second area of overlap, or the area between the first area of overlap and the second area of overlap.

16. The system of claim 15, wherein mapping the port of the block to the internal net and the external net, further comprises determining a port segment size and segmenting the port into a plurality of segments having dimensions corresponding to the port segment size.

17. The system of claim 16, wherein determining the first area of overlap between the port and the external net comprises identifying one or more segments in which the port and the external net overlap.

18. The system of claim 16, wherein determining the second area of overlap between the port and the internal net comprises identifying one or more segments in which the port and the internal net overlap.

19. The system of claim 16, wherein determining the area corresponding to the signal path between the first area of overlap and the second area of overlap comprises identifying one or more segments between the first area of overlap and the second area of overlap.

20. The system of claim 16, wherein the block identified for processing comprises a critical block.

\* \* \* \* \*